United States Patent [19]

Boström

[11] 4,269,878

[45] May 26, 1981

[54] STAND STRUCTURE

[76] Inventor: Harry N. Boström, Box 805, Borlange, Sweden

[21] Appl. No.: 51,647

[22] Filed: Jun. 25, 1979

[51] Int. Cl.[3] .......................... A47G 1/16; G08B 3/00; G10K 1/068

[52] U.S. Cl. ...................................... 428/11; 40/440; 116/151; 248/121; 248/158

[58] Field of Search ............... 116/148, 150, 170, 151; 40/439, 440, 441; 428/11; 248/158, 121

[56] References Cited

U.S. PATENT DOCUMENTS

| | | | |
|---|---|---|---|
| 1,253,662 | 1/1918 | Adams et al. | 116/148 |
| 1,348,836 | 8/1920 | Patremio | 116/170 X |
| 2,108,002 | 2/1938 | Smith et al. | 40/440 |
| 2,345,517 | 3/1944 | Weiss | 40/441 |
| 2,876,339 | 3/1959 | Thorne | 40/441 |
| 2,922,330 | 1/1960 | Chuy | 116/148 X |
| 3,070,919 | 1/1963 | Peckham | 116/170 X |
| 4,108,104 | 8/1978 | Kupperman et al. | 116/148 |

Primary Examiner—Daniel M. Yasich
Attorney, Agent, or Firm—William A. Drucker

[57] ABSTRACT

A stand structure, preferably for candle chimes comprises a base member, a pillar member which is detachably connected to said base member, a bracket member, preferably in the shape of a star and serving to hold the bells of the chime and a vertical shaft, the upper end of which being conical and serving as a journal for the rotor of the candle chime. The bracket comprises two identical parts, having indentations and cut out portions which when said parts are superimposed in register with each other form a circular opening for the shaft as well as an opening for cooperation with a corresponding portion of the pillar to keep the bracket parts pressed against each other and the shaft clamped between said bracket parts.

2 Claims, 4 Drawing Figures

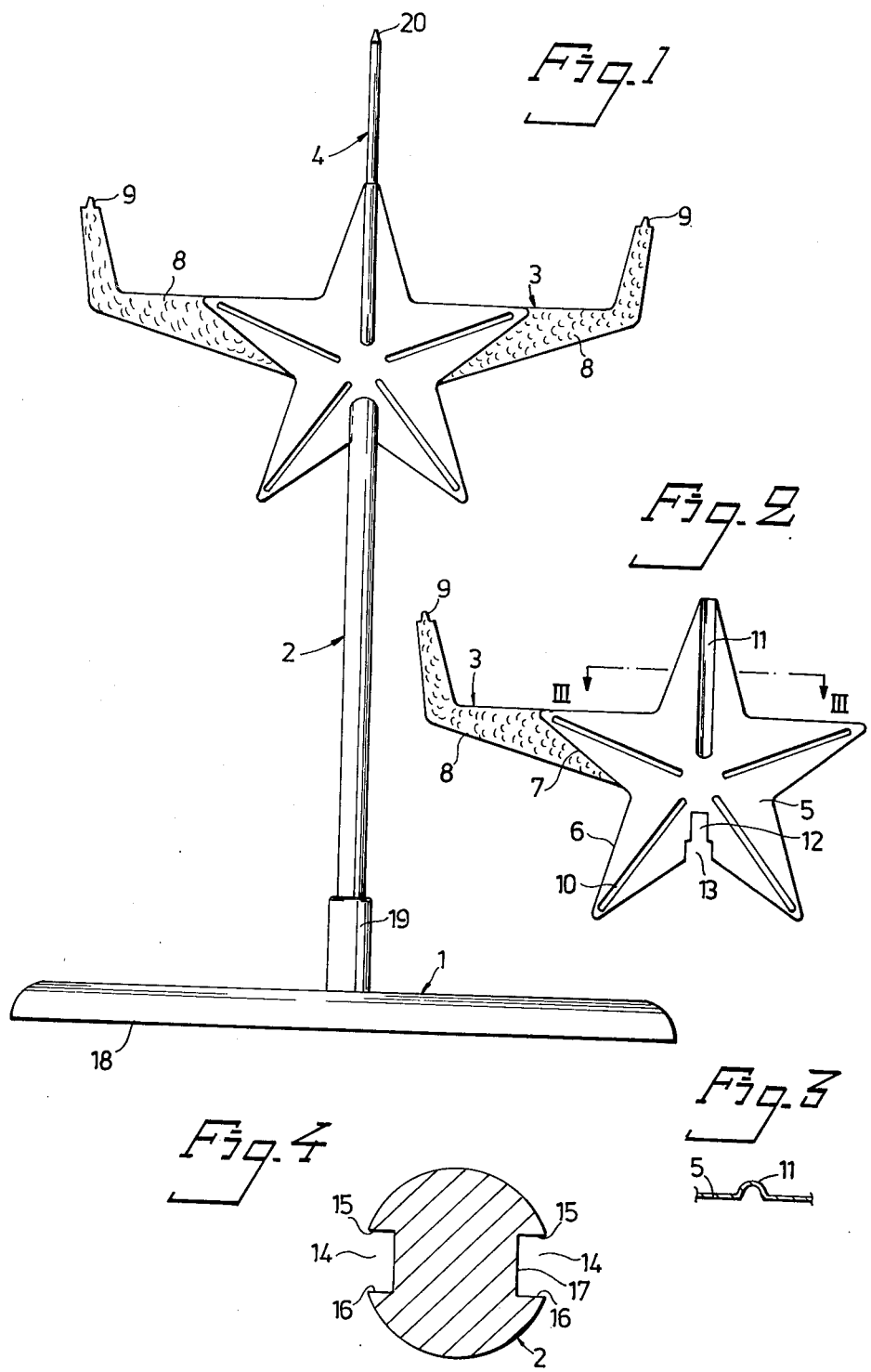

STAND STRUCTURE

The present invention relates to a stand structure.

Primarily, said stand is to be used for the type of products called chimes and comprising a stand carrying a bracket for sounding or jingling elements shaped as bells or the like, and also carrying a journalling means for a rotor provided with blades. Candles are fixed to the base plate of the chime and the air stream generated by the lighted candles brings the rotor to rotate. As the rotor in the movement thereof brings along a portion carrying clappers or drops, the bells will be struck by said clappers and a fragile sound is generated.

However, it will be noted that the stand structure according to the invention is not limited to the disclosed purpose but may be applied to a number or products having similar problems to be solved as to the function and/or structure of the stand.

The main object of the present invention is to provide a stand structure of the type disclosed in the preamble, which stand is assembled of simple parts which are also low in cost and which rapidly and simply may be assembled to define a stable and appealing unit.

To accomplish these and other objects, the invention has the characteristics disclosed in the following claims.

In the accompanying drawing, an examplifying embodiment of the invention is shown, whereby FIG. 1 is a side view of the stand structure used in a chime;

FIG. 2 is a side view of one of the two details defining the bracket of the stand;

FIG. 3 is a section along line III—III in FIG. 2 and, finally,

FIG. 4 is an end view of a bar shaped member included in the stand structure.

In the drawing, reference numeral 1 designates the base portion of the stand structure. A tube or bar member or pillar 2 vertically projects from said base portion, which member has a bracket 3 in the upper end thereof, and said bracket has a journalling shaft 4 co-axial to the member 2.

The members described comprises parts of a chime. Thereby, the base portion has brackets for candles and the upper ends of the extending arms of the bracket has bells and the journalling shaft carries a rotateably mounted bladed rotor, which is connected to a portion carrying clappers to engage the bells in a manner disclosed in the preamble of the description. Since these members of the chime do not form part of the invention, they are not illustrated in the drawing and will not be further described.

The bracket 3 comprises two identical details, which preferably comprise punched metal members 5, having a contour 6 and marked contour lines 7, which in the illustrated case have been obtained by hammering the surface 8, which defines a projecting arm. The upper, outer end of said arm 8 is shaped as a pin 9 into which an opening in a bell, not shown, fits. In order to give the star a more three dimensional appearance and to strengthen the part, indentations 10 may be provided in the form of rays towards the points of the star. An indentation 11, which according to FIG. 3 has approximately a semicircular section, extends from the upper point of the star towards the centre thereof for a purpose to be described. In the extension of the indentation 11 and at a distance from the same, two recesses 12, 13 are made in the sheet metal part 5 for a purpose to be described.

As will be seen in FIG. 4 the tube or bar member 2 has a circular section but in the upper end thereof, as will also be seen in FIG. 1, said member 2 has two diametrically opposite grooves 14, the side limitations of which are guide surfaces marked 15 and 16 while the base has reference numeral 17.

The base plate 1 of the stand structure in the shown embodiment comprises a saucer like unit 18 preferably made by pressing or similarly working a sheet metal plate and an upwardly directed sleeve 19 is centrally attached to the bottom thereof, the inner diameter of said sleeve substantially corresponding to the diameter of the bar member 2. In order to prevent rotation of the bar member 2 in relation to the sleeve 19, for example, the bottom of the sleeve may have an extension which fits into a corresponding recess in the lower end of the bar.

The journalling shaft 4 of the stand structure is—as illustrated in FIG. 1—conically pointed in the upper end thereof to define an edge 20.

In order to assemble the described parts or members to the stand structure illustrated in FIG. 1, the two sheet metal parts 5 according to FIG. 2 are placed facing each other such that one of the parts may be brought into contact with the second part with the bulging portions 11 in register with each other (whereby they together define an opening having a circular section) and having the recesses 12, 13 superimposed.

In this position the symmetrically shaped flaps, defining the star, will cover each other so that the star configuration is maintained. In connection with placing the sheet metal parts onto each other it may be suitable to applicate the shaft 4 so that the lower free end thereof engages the bottom of the opening defined by the indentations 11.

With the members in said position the upper end of the bar 2 is then pushed into the recess 12, 13. As the recess or slot 12 has a width that substantially corresponds to the distance between the surfaces 17 of the bar and the recess or slot 13 has a width, that is larger than said distance, it is obtained that the end of the bar may be easily inserted into the recess but upon insertion encounters a successively increasing resistance. The distance between the surfaces 15, 16 of the bar substantially corresponds to twice the thickness of the sheet metal of part 5 and it is understood, that said circumstance keeps the parts 5 securely engaged with each other. The parts are so dimensioned that a suitable frictional force is obtained to effectively secure said parts. As the sheet metal parts 5 are kept pressed against each other also the journalling shaft 4 is reliably secured.

To obtain an even stronger clamping action between the sheet metal members and the shaft 4, the depth of the indentation 11 may successively decrease from the bottom thereof towards the free end thereof (in the drawing the upper end).

As will be seen from the disclosed matter, the members of the stand structure are very simple and assemblage as well as disassemblage is rapid and may be performed by any person with the aid of very simple instructions, and thus, the stand may be distributed in parts for assemblage on site.

I claim:

1. Stand structure, comprising a base portion, a pillar projecting from said base portion, a bracket projecting sideways from said pillar and at least one vertically extending journalling shaft having a journalling end and a lower end, said bracket comprising two preferably identical parts or members each having an elongated indentation projecting from an end surface thereof said parts being superimposed in a reversed manner such that said indentations together define an opening preferably having a circular section, said journalling shaft being inserted into the opening so defined, the pillar and the bracket further having cooperating means to keep the bracket parts pressed against each other and hold said lower end of the journalling shaft clamped between said bracket parts, wherein the pillar is a tubular member which has in one end thereof diametrically opposite guide means each one having guiding surfaces located at a distance from each other in the circumferential direction of the bar or tubular member corresponding to the thickness of the assembled bracket, said bracket preferably in an opposite end surface having a punched out portion said parts being superimposed in a reversed manner such that said punched portions are in register with each other and the end of the bar or tubular member provided with said guiding surfaces is inserted into the punched out portions of the bracket such that the edge portions of the bracket parts surrounding the punched out portions preferably by frictional force are kept between the guiding surfaces of said bar or tubular member, wherein the bracket in the assembled form defines a star having arms extending therefrom.

2. Stand structure as claim in claim 1, wherein the journalling end of the shaft in the portion thereof which extends from the assembled bracket has a conical end portion preferably defining an edge to journal a rotor.

* * * * *